United States Patent [19]

Smay et al.

[11] Patent Number: 5,607,130
[45] Date of Patent: Mar. 4, 1997

[54] SUPPORT APPARATUS FOR ARTS AND CRAFTS PROJECT

[76] Inventors: Sharon A. Smay, 1227 E. Tulip Dr.; Douglas R. Yohler, 1441 Lick Creek Pkwy. S. Dr., both of Indianapolis, Ind. 46227

[21] Appl. No.: 486,598

[22] Filed: Jun. 7, 1995

[51] Int. Cl.⁶ .................................................. A47G 29/00
[52] U.S. Cl. ..................... 248/125.3; 248/27.8; 248/165; 248/176.1
[58] Field of Search ................................ 248/121, 27.8, 248/125.1, 125.3, 176.1, 558, 165

[56] References Cited

U.S. PATENT DOCUMENTS

| | | | |
|---|---|---|---|
| 913,955 | 3/1909 | Hansen | 248/125.1 X |
| 1,073,874 | 9/1913 | Smith | 248/125.1 |
| 1,089,290 | 3/1914 | Thompson | 248/165 |
| 1,452,640 | 4/1923 | Hulick | 248/121 |
| 3,141,557 | 7/1964 | Marschak | 248/165 X |
| 3,514,062 | 5/1970 | Gordon | 248/125.3 X |

FOREIGN PATENT DOCUMENTS

619106   3/1961   Italy ..................... 248/125.3

Primary Examiner—Philip C. Kannan
Attorney, Agent, or Firm—Baker & Daniels

[57] ABSTRACT

An apparatus for supporting an arts and crafts project during the creation, decoration, repair, or display of the project. The support apparatus includes a support rod upwardly projecting from a base positionable upon a support surface such as a table top. A hanging module, which may be variously shaped including peg or hook shapes, inserts into vertically spaced holes in the support rod, and the project is hangable from the hanging module. Adjustment of the height of the hanging module to customize the support apparatus to different sized projects can be performed by inserting the hanging module into a different hole in the rod. The present invention also provides a stabilizer for limiting twisting of the arts and crafts project hanging from the hanging module.

18 Claims, 5 Drawing Sheets

SUPPORT APPARATUS FOR ARTS AND CRAFTS PROJECT

BACKGROUND OF THE INVENTION

The present invention pertains to devices used in arts and crafts activities, and, in particular, to a device used to support an article such as a wreath being worked on by a craftsperson.

Countless people participate in a wide range of creative activities which are commonly referred to as arts and crafts activities. Representative activities range from basket and wreath making to woodworking projects. The reasons for which people partake in these activities are numerous and very diverse. For example, arts and crafts activities may be performed to serve as an outlet for creative impulses, or as a method of relieving stress, or possibly as a means of economic gain.

One popular arts and crafts activity involves making and/or decorating hanging adornments such as wreaths. Wreaths fabricated from materials such as twigs, styrofoam, wire, straw, paper mache, etc., can be purchased or made, and then decorated in an individualistic fashion which is aesthetically pleasing to the craftsperson. Wreath decorating typically involves affixing various items including flowers, greenery, figures, bows, ribbon, and cloth to the wreath with materials such as wire, string and/or glue or alternative adhesives.

While the process of transfiguring a wreath to enhance its appearance can be a fulfilling experience for the craftsperson, one aspect of the process can be especially problematic. In particular, for many people, the hassles of holding and maneuvering the wreath during the transfiguration process is frequently an annoying and inconvenient task which interferes with decorating.

Specifically, when decorating a wreath, a craftsperson typically rotates the wreath to center the wreath, i.e. identify the rotational orientation where the wreath looks best. A hangar for eventually mounting the wreath may be fashioned from a piece of wire or other element and attached to the wreath at this stage of decoration. Then, the craftsperson begins attaching the materials such as the bow or ribbons to the wreath. During this attaching or decorating process, due to the lack of a more viable alternative, many people resort to setting the wreath flat on a support or work surface such as a table top. Before adding each new decoration, a craftsperson frequently picks up the wreath from the support surface to recenter the wreath which may have shifted during decorating and to check how the decorations look in a frontal, mounted view. Besides being tedious, this continual recentering of the wreath provides abundant opportunity for displacing or disturbing those decorations previously placed.

Resorting to placing wreaths on a table top during decorating also may undesirably slow the decorating process. For example, when glue or another adhesive is employed to affix decorations, especially decorations which are attached on the back side of the wreath normally laid on the table top, drying time is required for the glue before the wreath can be returned to its normal arrangement on the support surface. When the wreath has to be set down on, for example, its front surface during glue drying, no further decorating of the front of the wreath can be undertaken. Consequently, a wreath or other hanging adornment that might otherwise be decorated within a several hour period takes up table or counter space for a longer time while waiting to be finished.

As many craftspersons decorate or create as a hobby and therefore work in their homes, for example at their kitchen tables, the drying wreaths take up important space and may have to be moved out of harms way at some point during their drying, increasing the likelihood of disturbing the placed decorations.

To overcome these problems, during the decorating process some craftspersons hang the hanging adornment from a hook placed in pegboard that has been mounted on a wall. Unfortunately, this technique is not always practical to all craftspersons for a variety of reasons. For example, besides the obvious problem that not everyone has a pegboard equipped wall, even those with access to pegboard also need a table, counter-top or other surface adjacent to the pegboard on which the decorations can be placed in order to make decorating convenient. In addition, the lack of portability is a shortcoming, as this technique does not allow a craftsperson the freedom to work wherever she/he desires, such as out on a picnic table on a nice day.

Thus, it would be desirable to provide a device which overcomes these shortcomings of the prior art.

SUMMARY OF THE INVENTION

The present invention provides an apparatus which supports in a hanging manner an arts and crafts project being worked on by a craftsperson. Use of the support apparatus frees a craftsperson to decorate or otherwise work on the project with both hands, and further reduces the risk of previously placed decorations being disturbed by eliminating the need for a craftsperson to continually pick up the project to view it from the perspective from which it may eventually be viewed when mounted. The support apparatus is adjustable to accommodate different sized projects. The support apparatus may also be made lightweight so as to be portable and can be readily disassembled for convenient storage.

In one form thereof, the present invention provides an arts and crafts project support apparatus including a base positionable on a support surface, an upstanding component extending from the base, a hanging module associated with the upstanding component and upon which an arts and crafts project is hangable, and means for adjusting a height of the hanging module above the base to adapt for different size arts and crafts projects.

In another form thereof, the present invention provides a portable support apparatus for an arts and crafts project comprising a base positionable on a support surface, an upstanding member extending from the base, a hanging module, mounted to the upstanding member, upon which the arts and crafts project is hangably mountable, and a stabilizer mounted to either the base or upstanding member that is structured and arranged to engage a portion of the arts and crafts project to limit twisting of the project.

In still another form thereof, the support apparatus of the present invention is for holding an arts and crafts project and includes a base positionable upon a support surface, an upstanding member extending from the base, wherein the upstanding member includes a plurality of mounting holes in vertically spaced apart relationship, and at least one hanging module from which the arts and crafts project is hangable. The hanging module is insertable into at least one of the mounting holes for connection with the upstanding member, and the hanging module is vertically adjustable relative to the base by selective insertion of the hanging module within different mounting holes.

One advantage of the support apparatus of the present invention is that it provides a support for a hangable object such as a wreath while the wreath is being created, repaired or displayed.

Another advantage of the support apparatus of the present invention is that it may be readily manufactured and assembled so as to be affordable to many users.

Another advantage of the support apparatus of the present invention is that it may be disassembled for storage so as to require minimal storage space when not being used.

Still another advantage of the support apparatus of the present invention is that it is portable so as to be employed wherever a craftsperson desires to work.

Still another advantage of the support apparatus of the present invention is that it can be adjusted to accommodate different size objects in a simple and easy fashion.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the invention, the drawings are not necessarily to scale and certain features may be exaggerated or omitted in order to better illustrate and explain the present invention.

DESCRIPTION OF THE PREFERRED EMBODIMENTS

Figure 1:
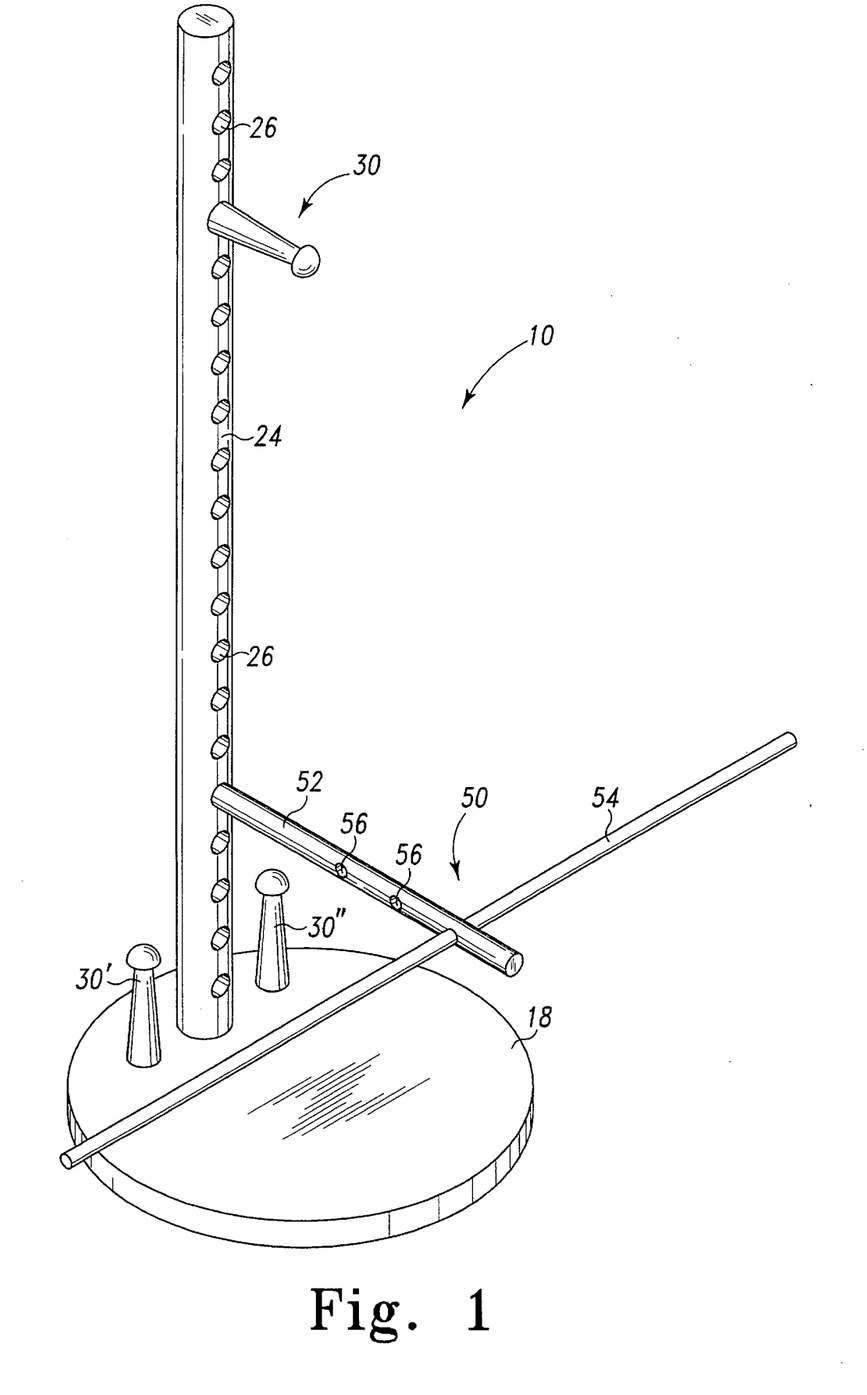
FIG. 1 is a perspective view of a preferred embodiment of an arts and crafts project support apparatus of the present invention.

Referring now to FIG. 1, there is shown a front perspective view of an embodiment of a portable support apparatus, generally designated 10, which is configured according to the principles of the present invention. Support apparatus 10 has been particularly designed to serve as a portable device for supporting or holding various arts and crafts projects which are being created, decorated, repaired, or displayed by a craftsperson. A wreath 15 abstractly shown in dashed lines in the front and side views of FIGS. 2 and 3, respectively, is one type of arts and crafts project with which support apparatus 10 finds especially beneficial application. Other projects, for example non-circular adornments which are displayed or mounted in a hanging fashion, may also be held by the instant invention to facilitate their being worked on by an artisan.

Figure 2:
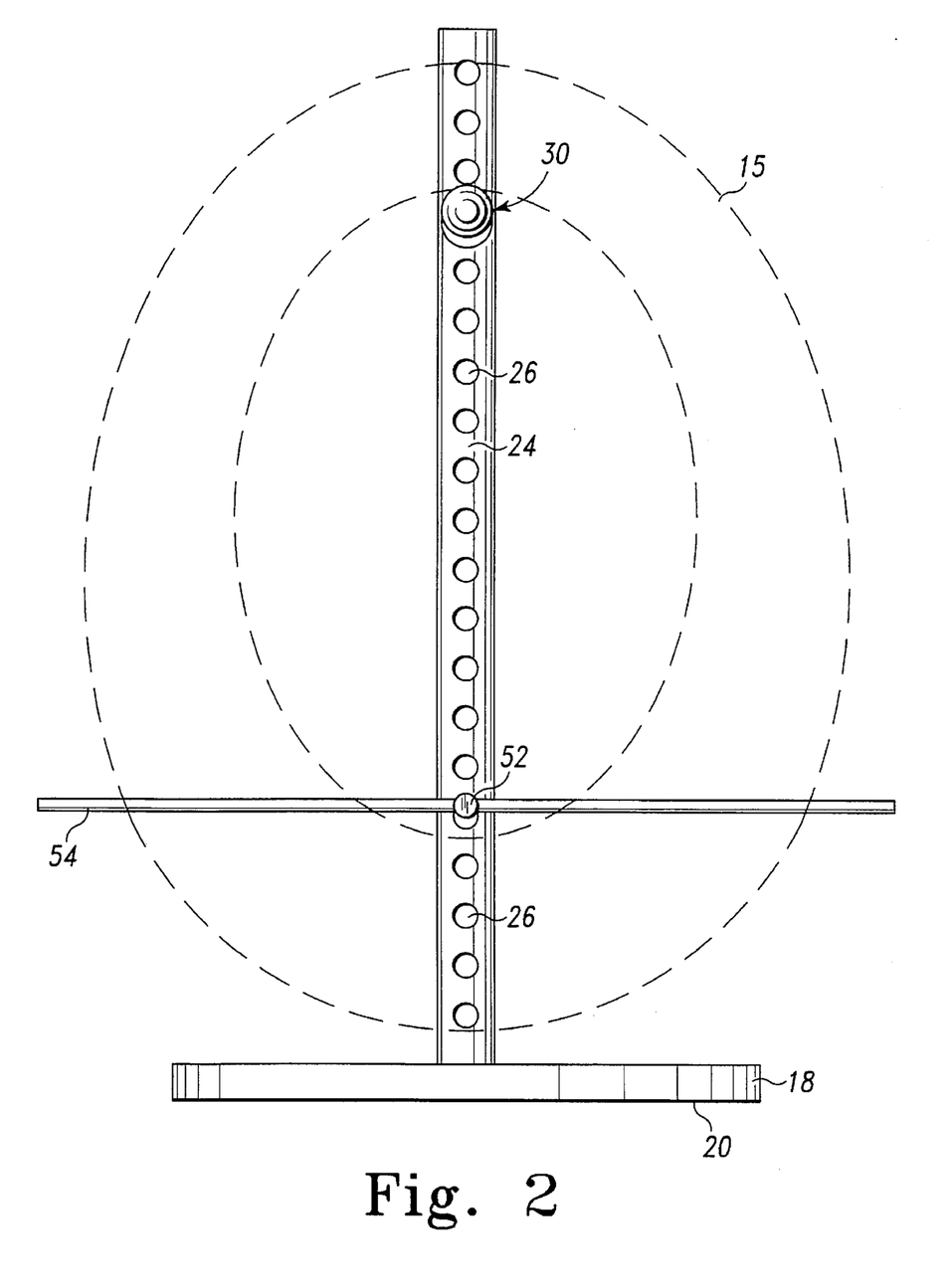
FIG. 2 is a front view of the support apparatus of FIG. 1 with a wreath being decorated abstractly shown in dashed lines and with the extra hanging modules removed for illustration purposes.
Figure 3:
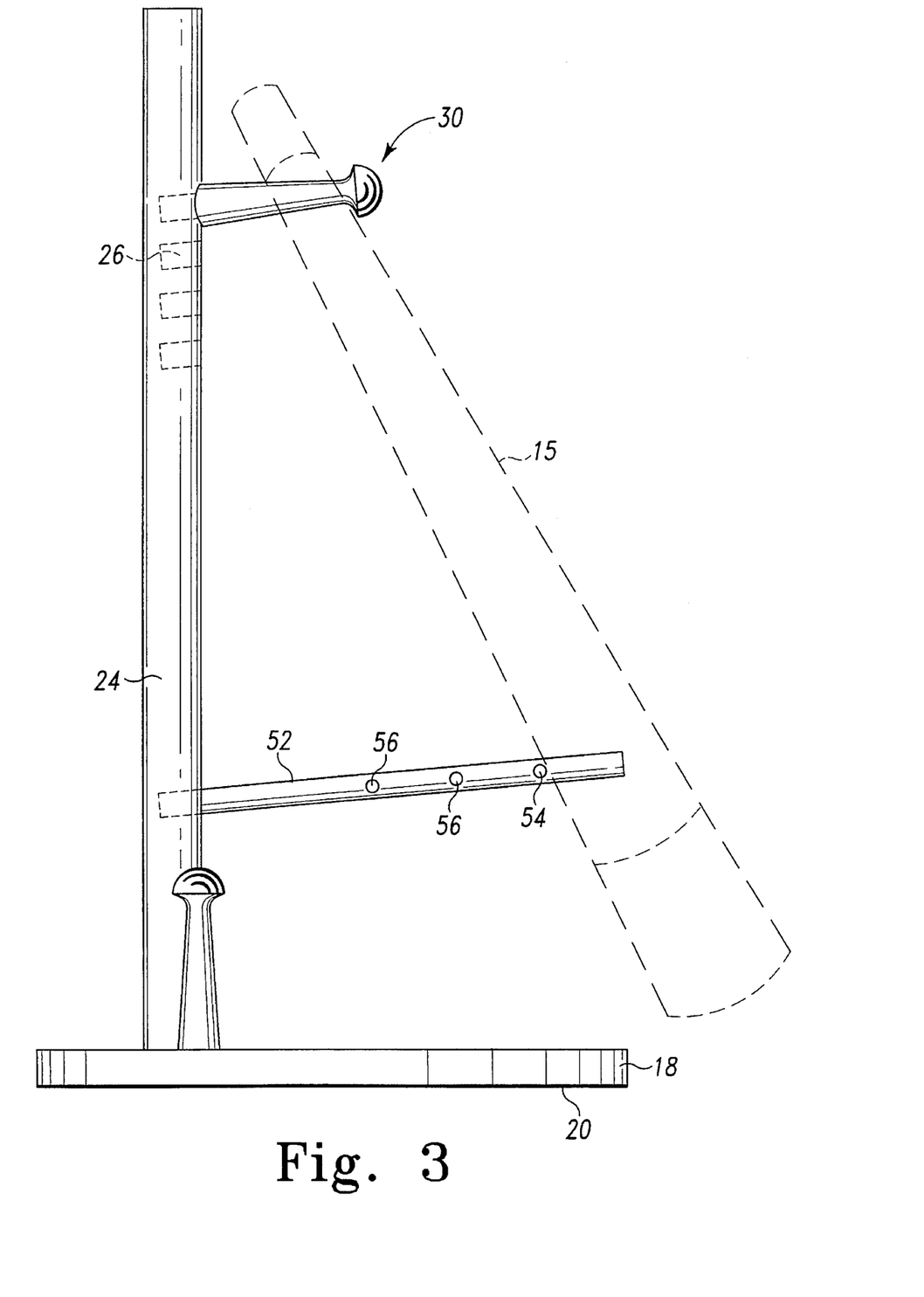
FIG. 3 is a side view of the support apparatus and wreath of FIG. 2 and showing the extra hanging modules.

Referring now to FIGS. 1–3, support apparatus generally includes a base 18 which can be set or placed by a user on a work or support surface such as a table top, counter-top, work bench or floor. Base 18 is shown as having a circular, plate-shaped construction with a flat, underside surface 20 which rests flush on planar support surfaces. Base 18 forms a sturdy platform which is resistant to tipping and wobbling during usage. Other suitable base configurations may also be employed, including differently shaped platforms as well as legged structures such as a tripod design.

A cylindrical rod 24 upwardly projecting from base 18 is used as a support for the hanging module or component part upon which wreath 15 is hanged. Rod 24, which may be fabricated from a readily available wooden dowel, friction fits within a blind bore provided in a rear portion of base 18. A mechanical fastener such as a screw (not shown) can be inserted from the underside of base 18 into the lower end of rod 24 to positively, but removably, connect rod 24 to base 18.

Rod 24 is shown being straight in shape and extending directly vertically above base 18. For this rod design, the off-centering of rod 24 on base 18 allows the center of gravity of the supported wreath 15 to be better centered over base 18 such that the propensity for tipping or toppling of support apparatus 10 is reduced. It will be recognized that in alternate embodiments, an upstanding rod angled from the vertical orientation of support rod 24 shown or curved or otherwise differently shaped may be substituted while still providing a suitable wreath support. In addition, rather than the rod shape shown, other constructions, such as a rectangular plate shape or a block shape, may be employed as the support member.

At evenly spaced intervals, a series of vertically aligned, cylindrical holes or cavities 26 are provided in support rod 24. As shown in the side view of FIG. 3, where only a selected few holes are illustrated as they are representative of all the holes in rod 24, holes 26 are formed as blind bores drilled at a downward angle into rod 24. Although holes 26 may be alternatively formed, such as bores completely extending through rod 24 or as keyed shapes into which the hanging modules non-rotatably insert, the instant design is preferred for purposes of ease of manufacture.

Figure 4:
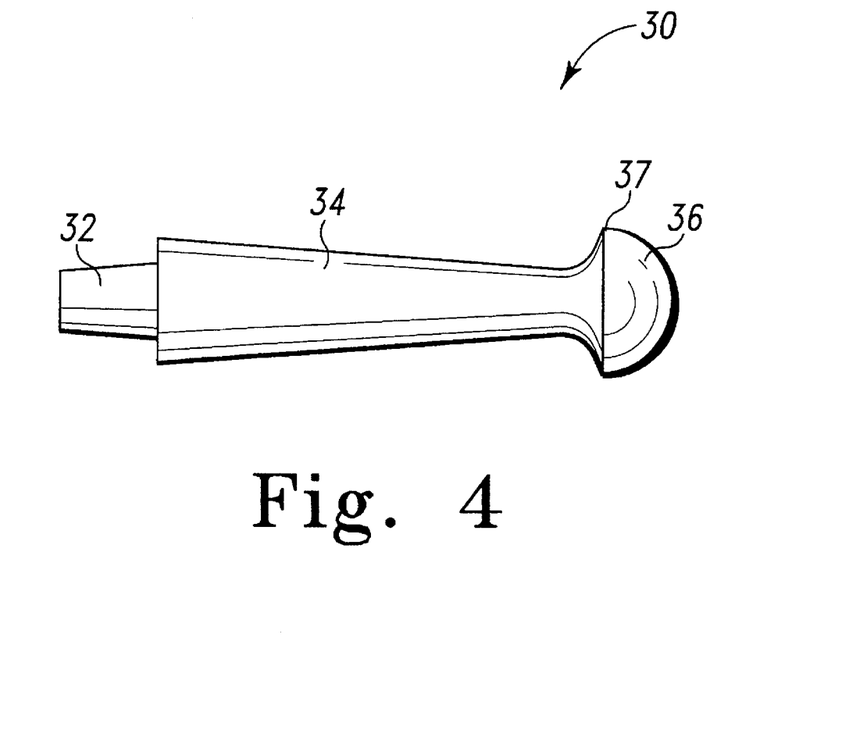
FIG. 4 is a side view of a first embodiment of a hanging module of the present invention.

As shown in FIGS. 1–3, operationally mounted in a single hole 26 is a first embodiment of a hanging module, generally designated 30. With additional reference to FIG. 4, hanging module 30 is a peg type module made of wood and includes a tapered plug end 32, a frustoconical body 34, and a knob end 36. Plug end 32 is sized and shaped to insert in a friction fit into any of holes 26. The angling of hole 26 aids in preventing module 30 inserted therein from falling out during use. Wreath 15 may be hanged over module body 34, and the radially protruding periphery 37 of knob end 36 serves to positively locate wreath 15 and aid in preventing wreath 15 from sliding off from hanging module 30.

Hanging module 30 can be inserted as desired into any of holes 26 to vertically adjust the height at which wreath 15 is held above base 18. As best shown in FIG. 1, extra hanging modules 30' 30" which are shown similarly configured to hanging module 30, may be inserted and retained in blind holes provided in base 18. In instances where multiple, smaller wreaths are desired to be simultaneously hanged on support apparatus 10 for decoration, one or both of hanging modules 30' 30" may also be placed in different holes 26 and used with hanging module 30 to support two or three wreathes. Further, although shown as being similarly dimensioned as hanging module 30, modules 30' 30" may be differently dimensioned to better accommodate differently sized hanging adornments. For example, for larger size wreaths, a longer body 34 on the hanging module reduces the likelihood that the wreath will slide off the module.

Figure 5:
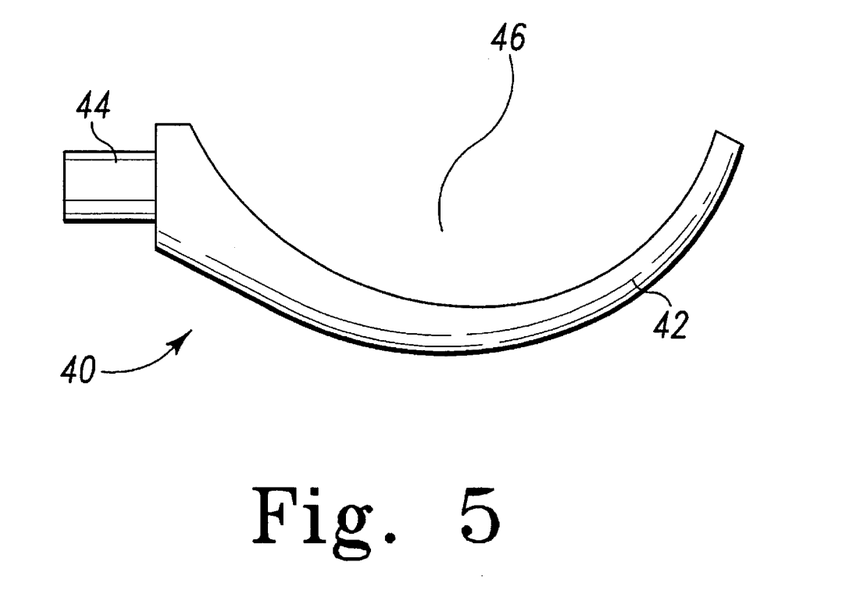
FIG. 5 is side view of a second embodiment of a hanging module of the present invention.

For use with the shown configuration of support component 24, alternate hanging modules may be substituted within the scope of the invention. For example, as shown in FIG. 5, a hanging module 40 including a hook shaped body 42 and a tapered plug end 44 provides an arcuate recess area 46 in which wreath 15 nests during hanging. In addition, alternate hanging modules could be configured to engage a hangar assembly attached to the wreath in order to hang the wreath on support apparatus 10.

The above complementary configuration of support rod 24 and hanging module 30 is preferred as it advantageously provides support apparatus 10 with the adaptability to accommodate a particular arts and crafts project or projects being worked upon without unduly complicating the manufacture or use of the apparatus. However, other designs of the support component and hanging modules may be substituted within the scope of the invention. For example, a telescoping support rod may be provided in order to adjust the height, relative to base 18, of a hanging module fixedly or removably mounted to the support rod. The hanging modules could alternatively be slidably mounted to support rod 24 and securable thereto at a desired height by replacing the module plug end with, for example, an annular collar which encircles rod 24 and which includes a thumb screw having an inward end projecting within the open middle of the collar and which engages rod 24, or with an assembly which clamps onto rod 24.

Referring again to FIGS. 1-3, a preferred stabilizing assembly of the present invention will be described. The stabilizing assembly, generally designated 50, includes a mounting post 52 and a cross rod 54. Both post 52 and cross rod 54 are shown as shafts with a circular cross-section, but may be otherwise configured, for example as rectangular bars. Post 52 includes a proximate end shaped to have a friction fit with a hole 26 in support rod 24. Three coplanar bores 56 transversely extend through post 52, and the outward most bore 56 is shown receiving cross rod 54 therethrough. Bores 56 are of identical size and allow cross rod 54 to be inserted at different locations forward of support rod 24.

As shown in FIGS. 2 and 3, cross rod 54 functions as a rear support for wreath 15 and also arranges wreath 15 at a convenient, slightly upward working angle for the artisan. The rear supporting feature prevents wreath 15 from twisting or swaying relative to support rod 24 as wreath 15 hangs from hanging module 30. It will be appreciated that without cross rod 54 of stabilizer assembly 50, if a craftsperson were to press a decoration onto the left half of wreath 15, although wreath 15 would likely not spin appreciably around hanging module 30, i.e. rotate clockwise or counter-clockwise as viewed in FIG. 2, wreath 15 would tend to twist about an axis which generally lies in a plane defined by support rod 24 and hanging module 30.

Although only one cross rod 54 is shown, multiple, different length cross rods 54, all compatible with transverse bores 56, may be provided with each support apparatus 10. Shorter and longer cross rods 54 can be employed when the width of the suspended arts and crafts project is smaller and larger, respectively, such that the wreath or hanging object on support apparatus 10 is adequately stabilized while at the same time apparatus 10 does not occupy an unnecessarily large amount of space.

Figure 6:
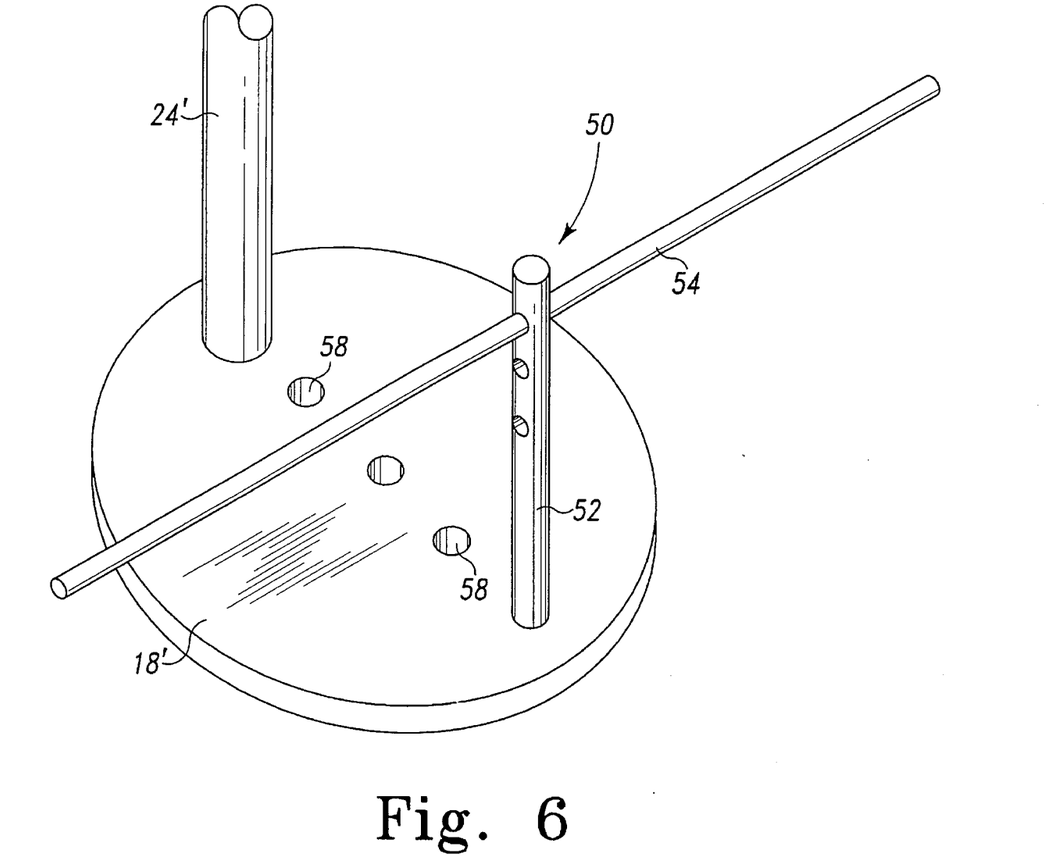
FIG. 6 is a fragmentary, front perspective view of an alternate mounting of a stabilizer of the present invention.

Referring now to the fragmentary view of FIG. 6, an alternate mounting of stabilizer assembly 50 is illustrated. While stabilizer post 52 and cross rod 54 are formed identically as in FIG. 1 and are therefore correspondingly numbered, post 52 is vertically oriented and the plug end of post 52 is insertable into cylindrical holes 58 provided in base 18'. Blind holes 58 are located at spaced intervals forward of support rod 24' to allow the forward position of stabilizer assembly 50 to be adapted to the arts and crafts project being worked on.

The shown two piece configuration of stabilizer assembly 50 is preferred as it provides the adaptability to account for different projects while also allowing for ready disassembly and storage in a minimal space. However, other stabilizer assemblies, for example a one-piece, T-shaped unit in the arrangement of post 52 and rod 54 or a solid sheet projecting from base 18 may be substituted within the scope of the invention. Further, a stabilizer which consists of a cross rod extending through a bore in support rod 24 orthogonally arranged relative to holes 26 may alternatively be employed.

The component parts of support apparatus 10 can be made of various and different materials, including woods, plastics, and metal materials, which have sufficient strength and rigidity to withstand operational loadings while still affording light weight characteristics so as to be readily portable.

The structure of support apparatus 10 will be further understood in view of the following explanation of its operation. When apparatus 10 is to be used, support rod 24 is assembled to base 18, hanging module 30 is inserted into a hole 26 selected by the craftsperson, and wreath 15 or another arts and crafts project being worked upon is suspended therefrom. The height at which hanging module 30 is positioned relative to base 18 is selected by the user, but is preferably at a location where the bottom of the hanging wreath 15 is in close proximity to base 18. For smaller wreaths, hanging module 30 will obviously be positioned lower than for larger wreaths. Experience has shown that objects mounted higher than necessary both take more effort to decorate, due to the need to lift the decorations farther, and are less stable as the likelihood of their being accidentally tipped over is increased.

Stabilizer assembly 50 is assembled by inserting stabilizer post 52 into a hole 26 such that post 52 projects through the central opening of wreath 15. Cross rod 54 is then inserted through one of the post bores 56. Cross rod 54 is positioned at a forward location along post 52 which props wreath 15 at a desirable angle from the standpoint of a craftsperson. Support apparatus 10 is now ready for operation.

A craftsperson can then decorate wreath 15 at his or her own pace without continually having to recenter wreath 15 after each decoration is placed and secured. When wreath 15 is finished, wreath 15 may be lifted from hanging module 30 and removed from support apparatus 10. Alternatively, if desired, support apparatus 10 can be utilized as a display stand for a completed wreath.

When support apparatus 10 is no longer desired to be used, it can be disassembled by removing cross rod 54 from stabilizer post 52, removing post 52 and hanging module 30 from support rod 24, and then disassembling support rod 24 from base 18. The separate components can then be stored in a convenient fashion as they require little space when so disassembled. Further, due to the light weight of the separate pieces, support apparatus 10 can be assembled and carried to a variety of locations, including an outdoor venue, where a craftsperson desires to work.

While this invention has been described as having multiple designs, the present invention may be further modified within the spirit and scope of this disclosure. For example, in still another embodiment, the support rod of the present invention is envisioned being pivotally mounted to a receptacle in which the remaining components can be stored, and in a track on the receptacle. The support rod is slidable along the receptacle track from a storage position, whereat the support rod is pivoted from a storage orientation to an operational, upright orientation and vice versa, to a use position which is in closer proximity to a user and which is therefore more convenient to a user. This application is therefore intended to cover any variations, uses, or adaptations of the invention using its general principles. Further, this application is intended to cover such departures from the Present disclosure as come within known or customary practice in the art to which this invention pertains.

What is claimed is:

1. An arts and crafts project support apparatus for use with a support surface, the support apparatus comprising:

a base positionable on the support surface;

an upstanding component extending from said base;

a hanging module projecting from said upstanding component and upon which an arts and crafts project is hangable;

means for adjusting a height of said hanging module above said base to adapt for different size arts and crafts projects, said adjusting means comprising a plurality of downwardly angled bores in said upstanding component in which said hanging module is removably mountable, said bores being in a vertically spaced apart relationship and in a vertical alignment whereby each bore is directly above the bore beneath it; and stabilizing means, mounted to at least one of said upstanding component and said base, for limiting twisting motion of the arts and crafts project hangable on said hanging module, said stabilizing means independent of said hanging module whereby said hanging module is movable to a different position above said base without moving said stabilizing means.

2. The support apparatus of claim 1 wherein said stabilizing means comprises a first member projecting in a first direction from said upstanding component and a cross member extending through a cross bore in said first member, said cross bore oriented generally transverse to said first direction.

3. The support apparatus of claim 2 wherein said first member further comprises at least one additional transverse bore through which said cross member is insertable to adapt said stabilizing means for different arts and crafts projects.

4. The support apparatus of claim 2 wherein said hanging module projects in said first direction from said upstanding component.

5. The support apparatus of claim 2 wherein said plurality of bores in said upstanding component open toward said first direction.

6. A portable support apparatus for an arts and crafts project comprising:

a base positionable on a support surface;

an upstanding member extending from said base;

a hanging module, mounted to said upstanding member, upon which the arts and crafts project is hangably mountable;

a stabilizer mounted to at least one of said base and said upstanding member, said stabilizer including a project engaging portion positioned in spaced relationship with said upstanding member and structured and arranged to limit twisting of the project; and means for positioning said project engaging portion of said stabilizer in a plurality of different spaced relationships with said upstanding member, whereby the arts and crafts project hangable from said hanging module may be selectively propped at different angles relative to said upstanding member.

7. The support apparatus of claim 6 wherein said hanging module is mountable to said upstanding member at a plurality of locations along a height of said upstanding member to adapt for different arts and crafts projects.

8. The support apparatus of claim 6 where in said stabilizer comprises a first post member mountable to at least one of said base and said upstanding member and a separate cross member connectable to said first post member and engagable with the arts and crafts project.

9. The support apparatus of claim 8 wherein said first post member mounts to said upstanding member and extends generally horizontally therefrom.

10. For holding an arts and crafts project and for use with a support surface, a support apparatus comprising:

a base positionable upon the support surface;

an upstanding member extending from said base, said upstanding member including a plurality of vertically aligned mounting holes in vertically spaced apart relationship;

at least one hanging module from which the arts and crafts project is hangable, said hanging module insertable into at least one of said mounting holes for connection with said upstanding member, said hanging module vertically adjustable relative to said base by selective insertion of said hanging module within different mounting holes of said plurality of mounting holes., wherein said at least one hanging module projects in a first direction from said upstanding member when inserted in one of said mounting holes;

a stabilizer extending from at least one of said base and said upstanding member, said stabilizer comprising a cross member oriented generally transverse to said upstanding member and positioned at a vertical location below said at least one hanging module, said cross member arranged to engage the arts and crafts project hanging from said at least one hanging module and limit twisting motion of the project; and means for positioning said cross member of said stabilizer in a plurality of different spaced relationships with said upstanding member, whereby the arts and crafts project hangable from said hanging module may be selectively supported by said cross member at different distances in said first direction from said upstanding member.

11. The support apparatus of claim 10 wherein portions of said stabilizer cross member engagable with the project are disposed farther from said upstanding member than an outer end of said at least one hanging module.

12. The support apparatus of claim 10 wherein said stabilizer comprises a mounting member insertable into at least one of said mounting holes.

13. The support apparatus of claim 12 wherein said stabilizer cross member comprises a shaft, wherein said mounting member comprises a longitudinally elongate post, and wherein said positioning means comprises a plurality of longitudinally spaced, transversely arranged bores in said post through which said cross member shaft is selectively extendable.

14. The support apparatus of claim 13 wherein said shaft comprises a circular cross-section.

15. The support apparatus of claim 10 wherein said at least one hanging module comprises a peg with an enlarged head preventing sliding dislocation of the project, said peg including a plug end sized and configured to friction fit within said plurality of mounting holes.

16. The support apparatus of claim 10 wherein said at least one hanging module comprises a hook shape.

17. The support apparatus of claim 10 wherein said plurality of mounting holes are angled relative to said base such that said at least one hanging module extends from said upstanding member at an upward angle relative to said base.

18. The support apparatus of claim 10 wherein said positioning means comprises a plurality of stabilizer bores in said base located at different distances in said first direction from said upstanding member, and wherein said stabilizer comprises a mounting member extending from said cross member, said mounting member insertable into at least one of said stabilizer bores.

* * * * *